United States Patent [19]

Loukes

[11] 3,762,898

[45] Oct. 2, 1973

[54] MANUFACTURE OF GLASS HAVING DESIRED SURFACE CHARACTERISTICS

[75] Inventor: David Gordon Loukes, Eccleston Park, England

[73] Assignee: Pilkington Brothers Limited, Liverpool, England

[22] Filed: Dec. 30, 1971

[21] Appl. No.: 214,483

Related U.S. Application Data

[63] Continuation-in-part of Ser. No. 174,258, Aug. 23, 1971, abandoned, which is a continuation of Ser. No. 872,928, Oct. 31, 1969, abandoned.

[30] Foreign Application Priority Data

Nov. 18, 1968 Great Britain .................. 54,679/68

[52] U.S. Cl. .......................... 65/30, 204/1, 65/111, 65/116, 117/124

[51] Int. Cl. .. C03c 15/00, C03c 21/00, B01d 59/40

[58] Field of Search .................... 65/30, 111; 204/1; 117/124

[56] References Cited

UNITED STATES PATENTS

| | | | |
|---|---|---|---|
| 3,393,987 | 7/1968 | Plumat | 63/30 X |
| 3,467,508 | 9/1969 | Loukes et al. | 65/30 |
| 2,075,446 | 3/1937 | Leibig | 65/30 X |
| 2,968,578 | 11/1961 | Mochel | 65/30 X |
| 3,429,742 | 2/1969 | Grego et al. | 65/30 L X |
| 3,528,847 | 9/1970 | Grego et al. | 65/30 L X |
| 3,681,041 | 8/1972 | D'Huart | 65/30 X |

*Primary Examiner*—Frank W. Miga
*Attorney*—Peter H. Smolka et al.

[57] ABSTRACT

The surface characteristics of glass, e.g., the tint, light transmission and heat rejection characteristics of float glass are modified by causing electrolytic migration of two metals into the glass surface in desired proportions from a body of molten alloy which is maintained to contact with the hot glass surface.

8 Claims, 2 Drawing Figures

PATENTED OCT 2 1973 3,762,898

DAVID GORDON LOUKES
INVENTOR

BY Peter H. Smolka
ATTORNEY

MANUFACTURE OF GLASS HAVING DESIRED SURFACE CHARACTERISTICS

CROSS-REFERENCE TO RELATED APPLICATIONS

This application is a continuation-in-part of copending application Ser. No. 174,258 filed Aug. 23, 1971 now abandoned which in turn is a streamlined continuation of application Ser. No. 872,928 filed Oct. 31, 1969 and now abandoned.

BACKGROUND OF THE INVENTION

1. Field of the Invention

This invention relates to the manufacture of glass having desired surface characteristics and more especially to the manufacture of glass having a desired tint and light transmission.

In solar heat rejecting glass such as is used for the glazing of buildings and for the windows of motor vehicles it is advantageous to reduce the amount of solar heat passing through the glass without appreciably reducing the light transmission.

2. Description of the Prior Art

The surface characteristics of glass, and more especially of float glass, can be modified by methods involving the maintenance of a body of molten electrically conductive material against the glass while the temperature of the glass is such that it is electrically conductive, and then passing a regulated electric current between the molten body and the glass which causes controlled migration of one or more elements from the molten material into the surface of the glass.

The body of molten electrically conductive material may be a body of a molten alloy which is located on the upper surface of the glass by clinging to a locating member of one of the metals of the alloy, positioned adjacent the glass surface, see U.S. Pat. No. 3,607,177.

It is a main object of the present invention to further improve this method in order to produce new forms of solar heat rejection glass in which both the tint and the light transmission characteristics of the glass are accurately controlled while an advantageous solar heat rejection is ensured.

According to the present invention, the temperature of the alloy in contact with the glass, the temperature of the glass, the time of treatment, and the electric current passing between the body of molten alloy and the glass are regulated in order to cause migration of metals into the glass from the alloy in a controlled proportion to produce predetermined characteristics in the glass.

SUMMARY

Glass is surface-modified while it is sufficiently hot to be electrically conductive, by locating a molten alloy in contact with the glass surface to be modified. The molten alloy comprises at least two elements which are to enter the glass. The temperature of the alloy is regulated, and a regulated voltage is applied between the molten alloy body and the glass so that controlled proportions of at least two metals enter the glass surface from the alloy. These controlled proportions determine the tint of the glass and the total migration from the alloy body into the glass determines the light and heat transmission characteristics of the glass.

The desired transmission characteristics of visible light which can be produced in the glass is the mean transmission in the visible spectrum. The transmission factor may vary from one end to the other of the spectrum but for the purposes of producing effective solar heat rejection glass while ensuring a high value of transmission of light through the glass, it is the mean transmission factor which is important, and it has been found that solar heat transmission is reduced to about 65 percent or less without any disadvantageous reduction in the transmission of visible light through the glass.

The visible light transmission is varied by controlling according to the invention the relative proportions of the elements which enter the glass in order to produce the desired tint. Thus in a preferred embodiment of the invention in which both copper and lead enter the glass surface from a body of molten copper/lead alloy the main transmission of solar heat is regulated by the total entry of copper and lead into the glass whereas the desired tint is produced in the glass by regulating the relative proportions of copper and lead entering the glass.

DESCRIPTION OF THE PREFERRED EMBODIMENTS

Figure 1:
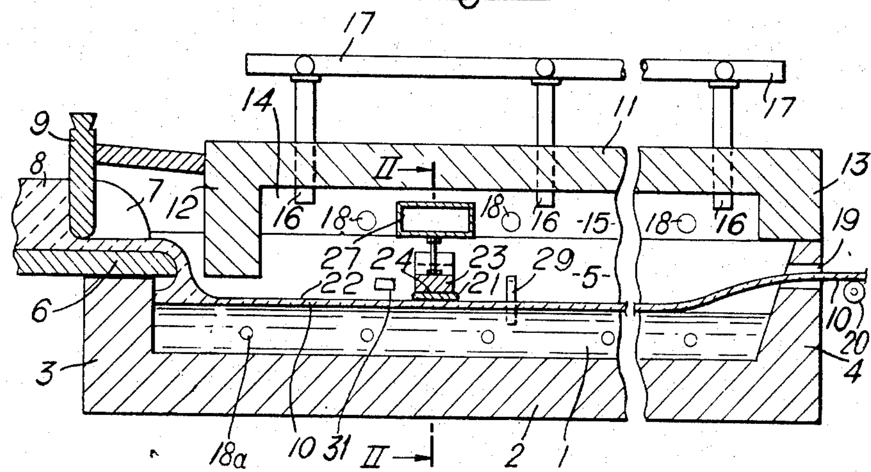
FIG. 1 is a sectional elevation through apparatus for carrying out the method of the invention for the production of float glass having a desired tint and light transmission.
Figure 2:
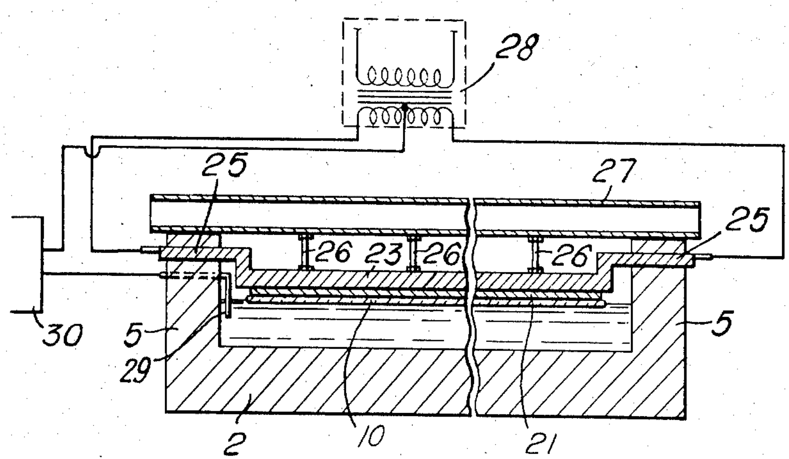
FIG. 2 is a section on line II—II of FIG. 1.

Referring to the drawings a bath of molten metal 1 is contained in a tank structure constituted by a floor 2, an end wall 3 at the inlet end of the tank structure, an end wall 4 at the outlet end of the tank structure and integral side walls 5 of the tank structure.

Overlapping the inlet end wall 3 of the tank structure there is a spout which comprises a lip 6 and side jambs 7 which together constitute a spout of generally rectangular cross section. The spout forms the termination of a forehearth of a continuous glass melting furnace and molten glass 8 from the furnace is held back by a regulating tweel 9 so as to regulate the flow of molten glass from the spout onto the surface of the bath of molten metal. This flow is thus at a controlled rate and forms a body of molten glass on the bath surface which body is advanced in ribbon form along the bath as indicated at 10 after there has been lateral flow of the molten glass on the bath surface under the influence of gravity and surface tension. The width of the tank structure between the side walls 5 at the surface level of the bath is greater than the width of the ribbon of glass produced so that there is no interference with the lateral flow of the glass on the bath during the production of the ribbon 10.

The bath of molten metal is preferably a bath of molten tin or of a tin alloy having a specific gravity greater than the glass.

A roof structure is mounted over the tank structure and comprises a roof 11, end walls 12 and 13 and side walls 14. The roof structure defines a headspace 15 over the bath into which headspace a reducing atmosphere including for example from 2 to 10 percent of hydrogen, is maintained at a plenum. Up to 15 percent of hydrogen may be present in the reducing atmosphere. The atmosphere is fed through ducts 16 extending through the roof 11 which ducts are connected to a header 17 through which the reducing atmosphere is supplied.

The molten glass 8 delivered to the bath is for example soda-lime-silica glass or glass already having a heat absorbing characteristic due to an iron content. The temperature of the glass arriving on the bath and advancing along the bath is regulated by thermal regulators 18 mounted in the headspace over the bath and thermal regulators 18*a* immersed in the bath of molten metal. At the inlet end of the bath the temperature of the glass is in the region of 1,000°C and the glass cools as lateral flow takes place so that by the time the glass is being advanced along the bath in ribbon form, as indicated at 10, its temperature is in the region of 900°C. The glass is gradually cooled during its continued advance until it reaches a temperature in the region of 600°C to 650°C by the time it approaches the outlet end of the bath at which temperature the glass is sufficiently stiffened to be taken unharmed from the bath through the outlet 19 between the end walls 4 and 13 on conveyor rollers 20 mounted outside the outlet end of the tank structure.

The upper surface of the glass is modified by the method of the invention to produce a desired tint and light transmission during the advance of the ribbon of glass 10 along the bath, by contacting the upper glass surface with a body of a molten alloy while the glass is sufficiently hot to be receptive to electrolytic modification. The surface treatment of the glass is carried out while the glass surface is at a temperature in the range 600°C to 900°C, most preferably between 600°C and 750°C or 800°C. A body of molten alloy 21 for example copper/lead alloy contacts the upper surface 22 of the hot ribbon of glass and the body 21 is located in contact with the surface 22 of the glass by wetting onto a locating member 23 in the form of a beam extending across the bath and bridging the path of travel of the ribbon of glass. Preferably the beam is made of one of the metals of the alloy, that metal having a much higher melting point than the alloy itself. For example when the molten alloy 21 is a cooper/lead alloy the beam 23 is a copper beam. The lower face 24 of the beam 23 is positioned just above the upper surface 22 of the glass so as to permit the clinging body of molten alloy 21 to subsist over the glass ribbon located between the locating beam 23 and the glass surface 22.

The beam may be of a relatively inert metal for example tungsten, molybdenum or ruthenium which is wetted by the molten alloy.

The beam is shaped so that its central portion dips downwardly towards the surface of the bath of molten metal and the beam is formed with end pieces 25 which rest on the side walls 5 of the tank structure. The central part of the beam is suspended by hangers 26 of electrically insulating material from a hollow section support beam 27 which is mounted across the tank structure. Cooling liquid for example water is circulated through the beam 27 in order to maintain the dimensional stability of the beam. Thereby it assists in maintaining the desired uniformity in the gap existing between the lower surface 24 of the beam 23 and the upper surface 22 of the ribbon of glass so as to ensure uniformity of treatment of the surface 22 of the glass right across its width.

The ends 25 of the beam are connected to the secondary winding of a heavy duty power transformer 28 by which alternating current is passed through the locating beam so as to regulate the temperature of the beam and thereby the temperature of the body 21 of molten alloy and the surface temperature of the ribbon of glass. A heating current of for example 2,000 amps may be passed through the locating member and this heating current will also pass through the body of molten alloy 21.

The temperature of the molten alloy limits the proportions of the two metals which can co-exist in true solution. For example, a molten copper/lead alloy at 750°C can contain up to 3 percent copper by weight. At a lower temperature the proportion of copper in the stable phase of the alloy decreases and at higher temperatures the proportion of copper in the stable phase is much greater; for example at about 900°C the alloy can contain up to 8 percent copper, by weight. If the beam 23 to which the molten alloy clings comprises the high melting point element in the alloy then the alloy will be saturated with the high melting point element and the concentration of the high melting point element in the alloy will be at the upper limit for the temperature. A higher concentration of the high melting point component in the alloy can only be achieved by raising the temperature of the alloy.

If it is desirable to treat the glass ribbon at a mean temperature through the thickness of about 750°C with a molten alloy containing a higher proportion of copper than could exist in the alloy at 750°C, heating current is passed through the locating beam to heat the alloy to a temperature at which the desired proportion of copper can exist in the alloy.

Further the locating member may be cooled, by the provision of suitable cooling arrangements, to a temperature of say 400°C at which temperature the copper content of the alloy is less than 1 percent while the temperature of the glass remains at about 700°C so that the electrical conductivity of the glass is not reduced.

The regulation of the temperature of the body 21 of molten alloy, and thereby the surface temperature of the glass, permits a wide range of control of the relative proportions of the two metals which enter the glass surface from the molten alloy body. One important consequence of this is the control of the tint of the glass particularly when viewed by reflected light, which control is thought to be due to the effect of the alloy temperature on the localised surface temperature of the glass during electrolytic treatment.

An electrode 29 dips into the bath of molten metal alongside the path of travel of the ribbon of glass and near to one end of the locating beam 23, which beam and the electrode 29 are connected to the input terminals of a D.C. supply indicated at 30. This supply is separately controlled to control the voltage applied across the glass between the body of molten alloy 21 and the bath of molten metal, which bath constitutes an electrode contacting the undersurface of the ribbon of glass 10. The existence of this voltage is such that current passes from the alloy through the glass to the molten metal bath and regulation of the voltage in relation to the temperature of the alloy and of the glass ensures a sufficient electric flux density across the alloy/glass interface that the current which flows causes migration of sufficient relative proportions of the two elements from the molten alloy body to ultimately produce the desired mean light transmission characteristic in the glass.

The electric flux density across the alloy/glass interface, measured in terms of coulombs per square meter, regulates the total entry of metal ions into the glass surface thereby controlling the mean transmission factor of the treated glass. For a given current the time of treatment of the glass passing beneath the body may be regulated in order to vary the relative amounts of the metals entering the glass by regulating the length of the alloy body considered in the direction of advance of the ribbon thereby controlling the time of treatment of the ribbon surface.

It is thought that the main entry of the metals into the glass surface takes place when the fresh glass surface is initially passing beneath the leading edge of the body of molten alloy. Thereafter the already treated glass surface shows a rapid change in electrical characteristics and the subsequent entry of the two metals into the glass surface, which depends on the relative ionic mobilities of the two metals in the glass surface under the conditions of operation, is controlled by the constantly changing electrical condition of the glass surface. The length of time of treatment of the glass as it passes beneath the molten alloy body determines the relative proportions of the two metals ultimately present in the treated surface layer of the glass. These proportions may be quite different from the proportions in which those metals co-exist in the stable phase of the molten alloy contacting the glass surface.

This voltage regulation to regulate the electric flux density into the glass also takes into account the variation in the ratio of the two metals entering the glass. As already described the variation in the copper/lead ratio depends on variations in the working temperature that is the temperature at the alloy/glass interface, as well as the time of treatment of the glass surface as it passes beneath the body 21. This treatment time is determined by the length of the body 21 considered in the direction of advance of the ribbon of glass towards the outlet end of the tank structure and this anode length may be varied in order to regulate the treatment time and thereby regulate the relative amounts of the two metals which enter the glass.

The electric flux density across the alloy/glass interface may be in the range 77.5 to 775 coulombs per square meter of glass, and with the glass ribbon being about 7.5 mm thick and the speed of the glass ribbon about 1.5 meters per minute passing beneath a body 21 of molten metal which is about 5 cm long, an effective solar heat rejecting glass having a bronze tint is produced.

In the following table the examples illustrate the way in which the setting of the temperature of the alloy body and the setting of the applied voltage determines the eventual optical properties of the glass which are stated in terms of:

Mean transmission in the visible spectrum
Solar heat reflection
Solar heat absorption
Solar heat direct transmission
Transmission colour
Reflection colour.

| Locating member | Cu | | | | | | Ag | | Cu |
|---|---|---|---|---|---|---|---|---|---|
| Molten alloy body A+B | Cu/Pb | | | | | | Ag/Pb | | Cu/Sn |
| Example | 1 | 2 | 3 | 4 | 5 | 6 | 7 | 8 | 9 |
| Glass thickness, mm | 6 | 6 | 10 | 6 | 6 | 6 | 6 | 6 | 6. |
| Glass temperature at anode position, ° C | 730 | 770 | 760 | 790 | 770 | 770 | 700 | 600 | 740. |
| Molten alloy temperature, ° C | 720 | 760 | 750 | 780 | 760 | 760 | 690 | 590 | 730. |
| Width of molten body, cm | 120 | 300 | 300 | 300 | 300 | 300 | 30 | 30 | 266. |
| Length of molten body, cm | 5 | 5 | 5 | 5 | 5 | 5 | 1.5 | 1.5 | 5. |
| Ribbon speed, m./min | 1.5 | 6.1 | 3.65 | 6.1 | 6.1 | 6.1 | 0.93 | 0.93 | 4.83. |
| Alloy composition, wt. percent | 2.2 Cu, 97.8 Pb | 2.8 Cu, 97.2 Pb | 2.6 Cu, 97.4 Pb | 3 Cu, 97 Pb | 2.8 Cu, 97.2 Pb | 2.8 Cu, 97.2 Pb | 55 Ag, 45 Pb | 30 Ag, 70 Pb | 62 Cu, 38 Sn. |
| Voltage, volts | 3.5 | 10 | 8 | 7 | 4.5 | 28 | 34 | 95 | 9.5. |
| Current, amps | 9.4 | 95 | 57 | 95 | 48 | 143 | 1.5 | 1.5 | 50. |
| Electric Flux Density across interface, Coulombs/m.² | 310 | 310 | 310 | 310 | 157 | 469 | 323 | 323 | 234. |
| Metals weight ratio in glass, A:B | Cu:Pb 0.54 | Cu:Pb 0.54 | Cu:Pb 0.54 | Cu:Pb 0.29 | Cu:Pb 0.18 | Cu:Pb 0.29 | Ag:Pb 0.01 | Ag:Pb 0.39 | Cu:Sn 4.25. |
| A concentration in glass surface, mg./m.² | Cu 95 | Cu 95 | Cu 95 | Cu 65 | Cu 23 | Cu 99 | Ag 3 | Ag 98 | Cu 123. |
| B concentration in glass surface, mg./m.² | Pb 176 | Pb 176 | Pb 176 | Pb 226 | Pb 130 | Pb 342 | Pb 343 | Pb 252 | Sn 29. |
| Mean transmission in visible spectrum, percent | 50 | 50 | 47 | 50 | 70 | 38 | 52 | 60 | 50. |
| Solar heat reflection, percent | 6 | 6 | 6 | 9 | 9 | 12 | 10 | 7 | 11. |
| Solar heat absorption, percent | 40 | 40 | 45 | 39 | 26 | 42 | 38 | 37 | 31. |
| Solar heat direct transmission, percent | 54 | 54 | 49 | 52 | 65 | 46 | 52 | 56 | 58. |
| Transmission colour | Bronze | Bronze | Bronze | Grey/bronze | Grey | Grey/bronze | Grey/amber | Yellow/grey | Pink. |
| Reflection colour | Yellow | Yellow | Yellow | Yellow/green | Neutral | Yellow/green | Faint yellow | Neutral | Copper. |

In the table Examples 1 to 6 each illustrate operation with a body 21 of molten copper/lead alloy clinging to a copper locating beam which determines the dimensions of the clinging body.

Examples 1 and 2 demonstrate how float glass with essentially identical optical properties can be produced under different conditions. In Example 1 the temperature of the alloy body is 720°C, the ribbon speed is 1.5 m/min. and the applied voltage is 3.5 volts giving an electric flux density of 310 coulombs/m². In Example 2 the temperature of the alloy body is higher at 760°C and the ribbon speed is also higher at 6.1 m/min. and this higher ribbon speed necessitates a much higher voltage to achieve the same electric flux density of 310 coulombs/m² and the same product as in Example 1.

At a higher temperature of 780°C of the alloy body as in Example 4 the amount of copper in the stable phase of the alloy body has increased to 3 percent as compared with 2.8 percent at 760°C in Example 2. The same electric flux density of 310 coulombs/m² is produced with a lower applied voltage of 7 volts, and at this temperature more lead migrates into the glass to give a slightly higher solar heat reflection, and to vary the tints of the transmission and reflection colours of the glass.

Examples 5 and 6 illustrate with Example 2 how, with the same alloy body temperature of 760°C, the light and heat transmission characteristics of the glass can be varied by adjusting the setting of the applied voltage.

The higher the voltage, the greater the electric flux density across the alloy/glass interface, giving a decreased mean transmission in the visible spectrum and an increase in the solar heat reflection and absorption.

Examples 7 and 8 both employ a body of molten silver/lead alloy clinging to a silver locating beam. In Example 7, when the molten body 21 of silver/lead alloy is at 690°C the alloy consists of 55 percent of silver and 45 percent of lead, by weight. The applied voltage of 34 volts gives an electric flux density of 323 coulombs/m² and the mobility of lead ions in the glass surface is so much higher than that of silver ions that the weight ratio of silver to lead in the glass surface is only 0.01.

At the lower temperature of 590°C in Example 8 the alloy consists of 30 percent silver and 70 percent lead by weight, and a much higher applied voltage, 95 volts, is necessary to give the same electric flux density of 323 coulombs/m². A higher relative proportion of silver ions enters the glass surface giving a weight ratio of silver to lead in the glass surface of 0.39. The resulting glass has a higher mean transmission in the visible spectrum than Example 7, and a lower solar heat reflection and absorption, due to the presence of a smaller total amount of metallic material in the glass.

In each of the examples the locating beam 23 is made from one of the metals of the alloy, which metal is soluble in the alloy, so that in Examples 1 to 6 when copper enters the glass the copper content of the alloy is continually replenished by solution of copper from the underface of the locating bar into the body of molten alloy.

Lead which migrates from the alloy body into the glass surface must be replenished in order to maintain the stable phase of the alloy. Replenishment of lead for example is effected by a controlled feed of small lead pellets from a dispenser through an aperture in the copper bar in which aperture the pellets have a residence so that the lead melts and gradually feeds through a restricted orifice into the body of molten alloy. Alternatively there may be a continuous feed of lead wire through cooled feeding arrangements into the vicinity of an edge of the body 21 so that lead is melted from the end of the wire into the body 21 at the same rate as lead is being carried by the current into the upper surface of the glass.

In another arrangement the locating beam 23 may be of a material which is wetted by the molten alloy but is inert with respect to the molten alloy, for example a beam of ruthenium may be used. The composition of the alloy is maintained by continuous feed of both metals of the alloy into the bath of molten alloy. For example there may be a continuous feed of copper wire and lead wire into the body 21 in order to maintain the stable phase of the alloy at the temperature of the body.

In each case the transmission factor is largely determined by the current flowing which determines the total entry of metal from the alloy into the glass surface.

The tint of the glass is largely determined by the temperature of the anode system and the temperature of the glass as it passes under the anode.

The glass treated by the electrolytic method of the invention and passing from beneath the body 21 may not require any subsequent treatment, but in the case of metals which colour the glass when in colloidal dispersion in the glass, the treated glass surface is exposed to the hydrogen-containing atmosphere in the headspace over the bath and the effect of the hydrogen is to reduce the metal existing in the surface layer of the glass to colloidal form so as to develop the desired proportions of the two colloidal metals, for example copper and lead, in the glass surface. The effectiveness of this reduction process depends on the temperature of the glass and the time that the glass is exposed to the hydrogen-containing atmosphere, so that by regulating these factors a further control of the ultimate transmission and tint characteristics of the glass is provided. If darker glass is required then the hydrogen content of the bath atmosphere may be increased, or the residence time increased, or the anode temperature increased, or any combination of these factors may be varied in order to produce a desired development of the colloidal dispersion of the metals which have already been caused to enter the glass in a desired proportion.

Thus the amounts of the two metals entering the glass during the electrolytic treatment may be regulated to take into account the subsequent colour developing treatment of the glass which is effected during the continued advance of the ribbon of glass along the bath of molten metal from beneath the alloy of molten metals, during which continued advance the ribbon of glass is being gradually cooled prior to its discharge from the bath and is exposed to a protective atmosphere maintained in the headspace over the bath which atmosphere is usually a reducing atmosphere, and may contain from 1 to 20 percent and preferably from 2 to 10 percent of hydrogen, in order to generate the desired reducing conditions for the development of the colloidal dispersion of metals in the glass surface.

A further control of the reflection tint observed from the glass can be achieved by adjusting the glass temperature just before the glass passes beneath the body 21 of molten alloy. A radiant heater indicated at 31 in FIG. 1 may be provided just above the bath surface to raise the temperature of the glass surface 21 just before the glass passes beneath the body 21. Thus for instance an increase in glass temperature of only 5°C just before the glass is treated can cause a change in the surface characteristics such that the ultimate concentrations of copper and lead in the extreme surface of the glass give the desired tint of the glass when viewed by reflected light.

The metals which are carried into the glass may be metals which develop ionic colours in the glass.

It will be appreciated that in setting up and operating the method of the invention the many factors which effect the tint and transmission characteristics of the glass have to be adjusted in relation to each other in order to bring the glass onto target so far as the required characteristics are concerned, that is both the mean transmission of the glass and the transmission and reflection tints of the glass.

The surface treatment of the float glass during its advance along the bath in no way affects the highly desirable float characteristics of the glass, that is its "fire finish" surface quality and its freedom from distortion, and indeed the optically reflective character of the treated surface of the float glass is enhanced by the introduction of metals from the alloy into that glass surface which metals impart a reflective tint to the glass surface and increase the solar heat reflection from the glass surface.

The invention thus provides a much more accurate method of controlling the surface modification of glass, in particular float glass, to produce a new solar heat rejection glass in which both the mean transmission of the glass, the transmission tint and the reflection tint can be separately adjusted in order to meet different customers requirements.

The treatment of the glass by the method of the invention may be carried out where the temperature of the glass is higher than 800°C or even where the temperature of the glass is lower than 600°C, for example when the glass is passing through an annealing lehr but is still sufficiently hot to be sufficiently electrically conductive to enable the treatment of the invention to be carried out on the glass. In the lehr, electrical connection is generally made with the under surface of the glass by means of a body of molten tin which clings to a locating member which holds that body in contact with the lower surface of the glass beneath the body of molten alloy located in contact with the upper surface of the glass which is being treated.

I claim:

1. In a method of manufacturing float glass having desired light and heat transmission characteristics in which a molten body of an alloy of at least two elements is located in contact with the upper surface of an advancing ribbon of float glass by clinging to a locating member surface comprising one of the metals of the alloy, and in which the temperature dependent, relative proportions of the dissolved elements in the alloy that co-exist in equilibrium with the said locating member surface are established at desired proportions and a voltage is applied between the molten alloy body and the glass to cause ionic migration from the alloy body into the glass surface, the improvement comprising the step of:

setting the applied voltage in relation to the thickness of the glass, the temperature of the alloy and of the glass and the time of contact of the molten alloy body and the ribbon surface to a value which enforces across the alloy/glass interface at said temperature an electric flux density in the range of 77.5 to 775 coulombs per square meter to produce sufficient ionic migration of each said element across that interface into the glass to impart desired light and heat transmission characteristics to the glass.

2. A method according to claim 1, further comprising prescribing the length of the alloy body considered in the direction of advance of the ribbon and thereby controlling the time of contact of the molten alloy body and the ribbon surface in relation to the speed of advance of the glass.

3. A method according to claim 1, wherein the molten alloy is a copper/lead alloy which is located in contact with the ribbon surface by clinging to a copper locating member and the temperature of the alloy is established in the range 600°C to about 800°C.

4. A method according to claim 1, wherein the molten alloy is a copper/tin alloy which is located in contact with the glass surface by clinging to a copper locating member and the temperature of the alloy is established in the range 600°C to about 800°C.

5. A method according to claim 1, including heating the glass ribbon just before it passes under the alloy body to control the reflection tint of the treated surface of the glass.

6. A method according to claim 1, wherein:

a molten body of copper/lead alloy clings to a copper locating member and contacts the ribbon surface where the ribbon temperature is in the range 730°C to 790°C, the relative proportions of copper and lead in the molten body in weight percentages are from 2.2 percent copper and 97.8 percent lead to 3 percent copper and 97 percent lead, and the electric flux density is in the range 150 to 470 coulombs per square meter, thereby producing a copper:lead weight ratio in the glass surface of from 0.15 to 0.54, a mean transmission in the visible spectrum of from 38 to 70 percent and solar heat direct transmission of from 46 to 65 percent.

7. A method according to claim 1, wherein said elements are colouring elements and further including the step of exposing the treated glass surface to a hydrogen-containing atmosphere for a sufficient time and at a sufficient temperature to reduce said elements migrated into the glass from the alloy body to colloidal form and develop a colloidal dispersion of colouring elements in the glass surface.

8. A method according to claim 1, wherein the molten alloy is a silver/lead alloy which is located in contact with the glass surface by clinging to a silver locating member and the temperature of the alloy is established in the range 600°C to about 800°C.

* * * * *